(12) United States Patent
Chávez et al.

(10) Patent No.: US 9,325,550 B1
(45) Date of Patent: Apr. 26, 2016

(54) FREQUENCY-DOMAIN WINDOWING FOR PRECISION POSITION, NAVIGATION, AND TIMING (PNT) ESTIMATION

(71) Applicants: Carlos J. Chávez, Marion, IA (US);
James H. Doty, Cedar Rapids, IA (US)

(72) Inventors: Carlos J. Chávez, Marion, IA (US);
James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/708,809

(22) Filed: May 11, 2015

(51) Int. Cl.
*H04L 27/227* (2006.01)
*H04W 24/02* (2009.01)
*G01S 5/02* (2010.01)
*H04W 24/08* (2009.01)

(52) U.S. Cl.
CPC ........... *H04L 27/2278* (2013.01); *G01S 5/0215* (2013.01); *H04W 24/02* (2013.01); *H04W 24/08* (2013.01)

(58) Field of Classification Search
CPC .. H04W 24/02; H04W 24/08; H04L 27/2278; G01S 5/0215

USPC ........................................ 375/224; 342/357.2
See application file for complete search history.

(56) References Cited

U.S. PATENT DOCUMENTS

2011/0286505 A1* 11/2011 Hedley .................. G01S 5/0205
375/224

* cited by examiner

*Primary Examiner* — Raymond Dean
(74) *Attorney, Agent, or Firm* — Angel N. Gerdzhikov; Donald P. Suchy; Daniel M. Barbieri

(57) ABSTRACT

Systems and methods for mitigating multipath effects on precision PNT estimation are disclosed. Frequency-domain windowing techniques are disclosed and utilized to mitigate multipath effects on precision PNT estimation for systems employing coherent communication signals. More specifically, to mitigate multipath effects an input signal, the input signal may be channelized into a plurality of carrier-specific signals, and each carrier-specific signal may be correlated against a reference signal to produce a corresponding carrier-specific correlation result. A window function may be applied to the carrier-specific correlation results for the plurality of carriers to produce a set of carrier-specific weighted correlation results. The set of carrier-specific weighted correlation results may be integrated to produce an integrated correlation output, which may then be utilized to facilitate PNT estimation.

20 Claims, 7 Drawing Sheets

FREQUENCY-DOMAIN WINDOWING FOR PRECISION POSITION, NAVIGATION, AND TIMING (PNT) ESTIMATION

BACKGROUND

Position, navigation, and timing (PNT) systems operate by estimating parameters such as time-of-arrival (TOA) and direction-of-arrival (DOA) of received signals. A common technique for achieving precision PNT estimation is for the PNT receiver to perform a correlation for a known reference signal. It is noted, however, that precision PNT estimation may be limited in the presence of multipath.

Multipath refers to a propagation phenomenon that results in radio signals reaching a receiving antenna by two or more paths. In the presence of multipath, precision PNT estimation can be limited by the side-peaks of the correlation function. For instance, for signals with rectangular or near-rectangular spectra, the first correlation side-peaks can be as large as 13 dB below the main peak. Side-peaks only fade away slowly as correlation lag increases.

While the correlation side-peaks may be reduced by altering the transmitted signal, altering the transmitted signal may have undesirable consequences on other aspects of system performance. For example, if the signal is also used for communications purposes, altering the transmitted spectrum could seriously degrade data link performance.

Therein lies a need for systems and methods for mitigating multipath effects on precision PNT estimation without the aforementioned shortcomings.

SUMMARY

An embodiment of the inventive concepts disclosed herein is directed to a method for mitigating multipath effects. The method may include: channelizing an input signal into a plurality of carrier-specific signals, wherein each carrier-specific signal of the plurality of carrier-specific signals corresponds to a signal transmitted on a particular carrier of a plurality of carriers utilized to transmit the input signal; correlating each carrier-specific signal against a reference signal to produce a corresponding carrier-specific correlation result for each particular carrier of the plurality of carriers; applying a window function to the carrier-specific correlation results for the plurality of carriers to produce a set of carrier-specific weighted correlation results; integrating the set of carrier-specific weighted correlation results to produce an integrated correlation output; and providing the integrated correlation output to facilitate a data process.

An additional embodiment of the inventive concepts disclosed herein is also directed to a method. The method may include: channelizing an input signal into a plurality of carrier-specific signals, wherein each carrier-specific signal of the plurality of carrier-specific signals corresponds to a signal transmitted on a particular carrier of a plurality of carriers utilized to transmit the input signal; correlating each carrier-specific signal against a reference signal to produce a corresponding carrier-specific correlation result for each particular carrier of the plurality of carriers; applying a window function to the carrier-specific correlation results for the plurality of carriers to produce a set of carrier-specific weighted correlation results; integrating the set of carrier-specific weighted correlation results to produce an integrated correlation output; and providing the integrated correlation output to facilitate a position, navigation, and timing (PNT) estimation.

A further embodiment of the inventive concepts disclosed herein is directed to system. The system may include a data interface configured to receive an input signal. The system may also include a processor in communication with the data interface. The processor may be configured to: channelize the input signal into a plurality of carrier-specific signals, wherein each carrier-specific signal of the plurality of carrier-specific signals corresponds to a signal transmitted on a particular carrier of a plurality of carriers utilized to transmit the input signal; correlate each carrier-specific signal against a reference signal to produce a corresponding carrier-specific correlation result for each particular carrier of the plurality of carriers; apply a window function to the carrier-specific correlation results for the plurality of carriers to produce a set of carrier-specific weighted correlation results; integrate the set of carrier-specific weighted correlation results to produce an integrated correlation output; and provide the integrated correlation output to facilitate a data process.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to systems and methods for mitigating multipath effects on precision PNT estimation. More specifically, frequency-domain windowing techniques are disclosed and utilized to mitigate multipath effects on precision PNT estimation for systems employing coherent communication signals. It is noted that coherence refers to a known phase relationship between the signals from carrier to carrier. Coherence is a defining characteristic of coherent frequency-hopping systems, and it is a byproduct of multi-carrier modulation schemes such as those used in orthogonal frequency-division multiplexing (OFDM) and the like. It is therefore contemplated that the systems and methods for mitigating multipath effects on precision PNT estimation in accordance with the inventive concepts disclosed herein are applicable to both coherent frequency-hopping signals and/or multicarrier signals.

Figure 1:
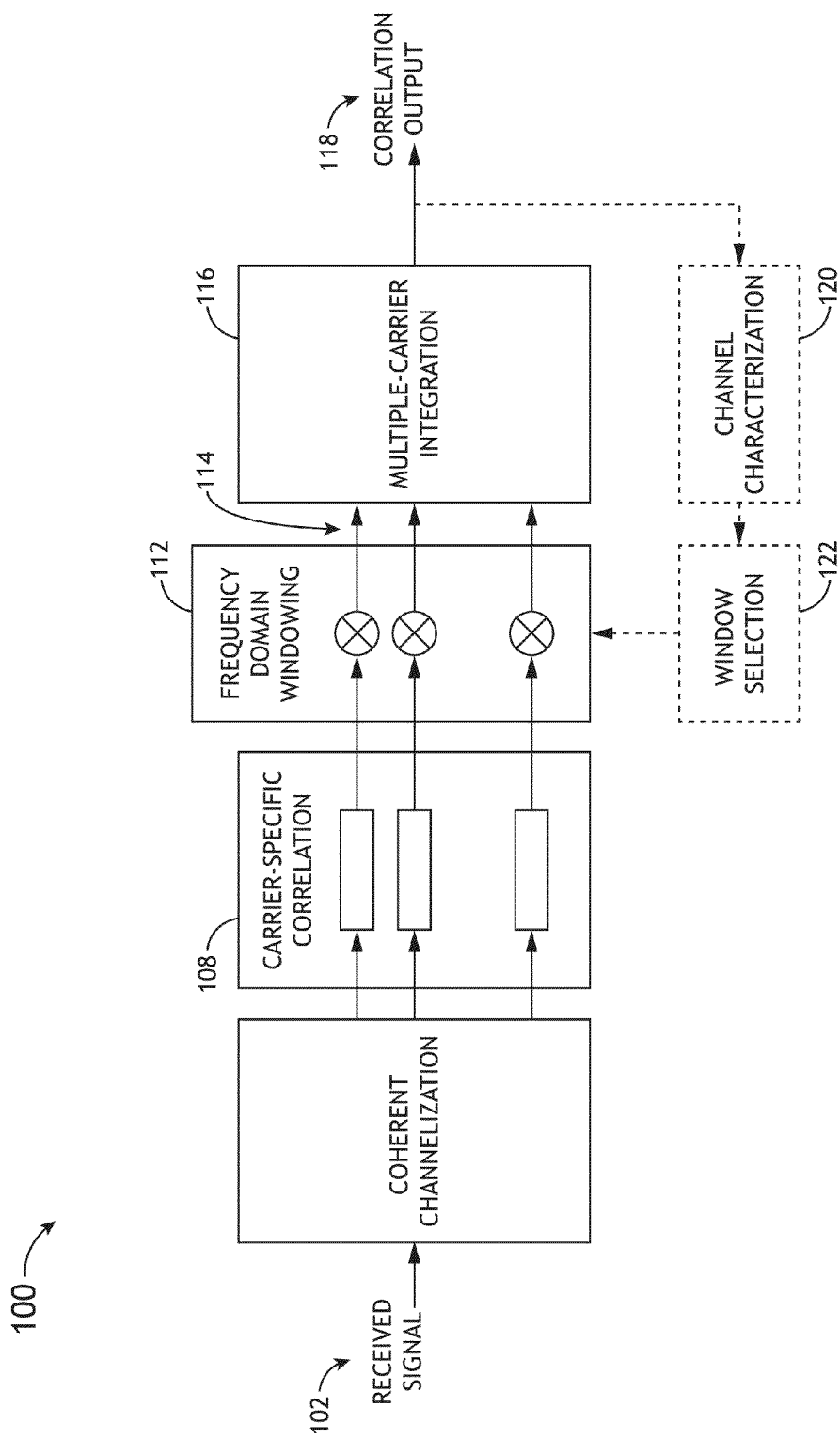
FIG. 1 is a block flow diagram depicting a method for mitigating multipath effects on precision PNT estimation in accordance with the inventive concepts disclosed herein.

FIG. 1 is a block flow diagram depicting an embodiment of a method 100 for mitigating multipath effects on precision PNT estimation in accordance with the inventive concepts disclosed herein. As shown in FIG. 1, upon receiving an input signal 102, the received input signal 102 may be coherently channelized in a step 104 to produce multiple parallel carrier-specific signals 106. In other words, the input signal 102 may be channelized into multiple carrier-specific signals 106 according to frequencies used to transmit the input signal 102. Each carrier-specific signal 106 produced may correspond to signals transmitted on a particular frequency or a particular range of frequencies (generally referred to as a carrier).

Once the received input signal 102 has been channelized into carrier-specific signals 106, a correlation against a reference signal may be performed independently for each of them in a step 108. It is contemplated that various known or yet to be developed correlation techniques may be utilized to perform the individual correlations. Subsequently, corresponding carrier-specific correlation results 110 may be produced and provided to a frequency-domain windowing process, which may then weigh (scale) the carrier-specific correlation results 110 in a step 112.

Figure 2:
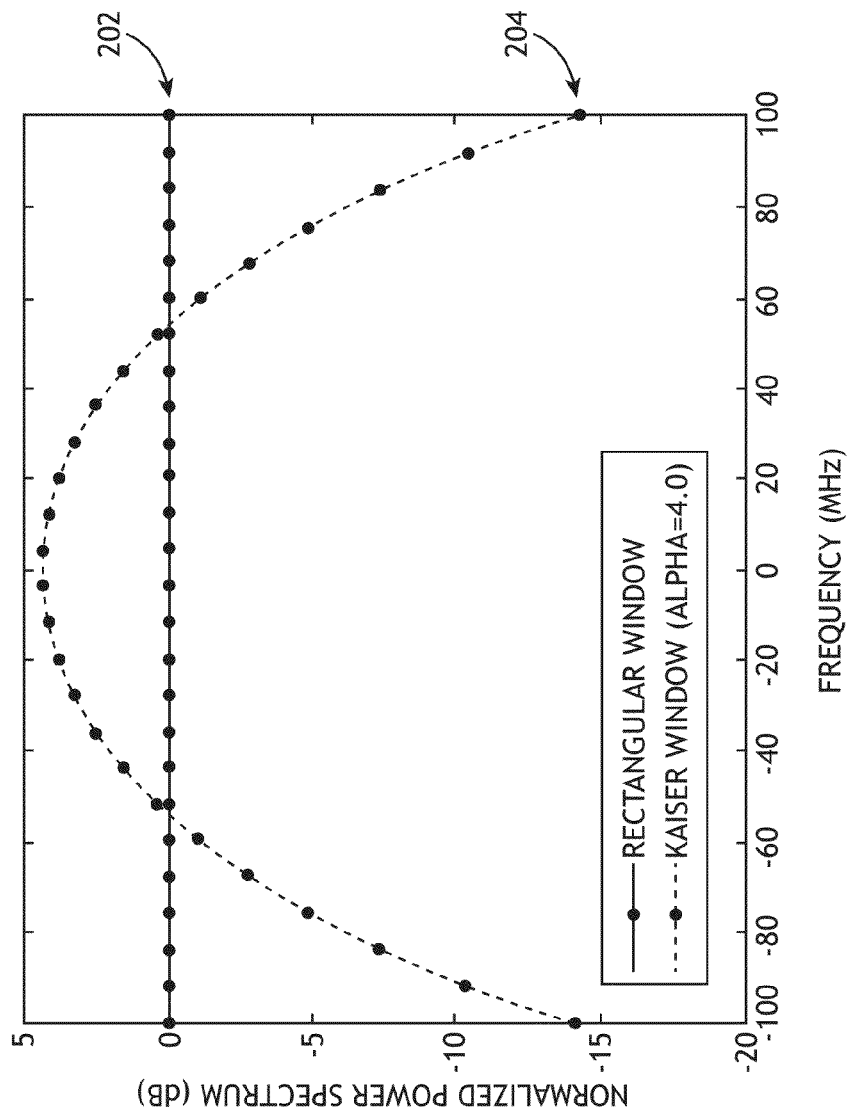
FIG. 2 is an illustration depicting two exemplary frequency-domain window functions.

In some embodiments, the frequency-domain windowing process may be configured to weigh each carrier-specific correlation results 110 based on some weighting function(s). It is contemplated that the weighting function may be taken from any of a number of known or yet to be developed window functions, such as Hamming windows, Blackman-Harris windows, Kaiser windows and the like, and applied over the frequency domain. FIG. 2 is an illustration depicting two exemplary window functions that may be applied over the frequency domain.

More specifically, consider an exemplary system that makes use of 26 carrier frequencies contiguously spread over 200 MHz, FIG. 2 depicts two frequency-domain window functions 202 and 204 that may be applicable to the 26 carrier-specific correlation results (which correspond to the correlation results 110 in FIG. 1). It is noted that the window function 202 depicted is a rectangular window and the window function 204 depicted is a Kaiser window (with parameter α=4.0, for example). The rectangular window 202 may simply weigh all carriers equally while the Kaiser window 204 may taper the weights applied to the carriers toward the edges of the 200 MHz band. It is to be understood that while only two window functions are depicted for purposes of presentation simplicity, various other types of window functions may be utilized without departing from the broad scope of the inventive concepts disclosed herein.

Referring back to FIG. 1, a frequency-domain windowing process may be applied to the set of carrier-specific correlation results 110 to produce a set of corresponding carrier-specific weighted correlation results 114. The carrier-specific weighted correlation results 114 may then be integrated in a step 116 to produce an integrated correlation output 118, which can then be used for PNT estimation. It is contemplated that the integrated correlation output 118 may be produced by calculating a sum of the carrier-specific weighted correlation results 114. For instance, for a multicarrier signal such as OFDM, the integrated correlation output 118 may be calculated by simply calculating a sum of all of the carrier-specific weighted correlation results 114 at a particular correlation lag to produce an integrated correlation output 118 at that same correlation lag. For a coherent frequency-hopping signal, on the other hand, the carrier-specific weighted correlation results 114 may be delayed relative to each other to align the correlation lags from each carrier frequency, and a sum may then be calculated to produce the integrated correlation output 118.

Figure 3:
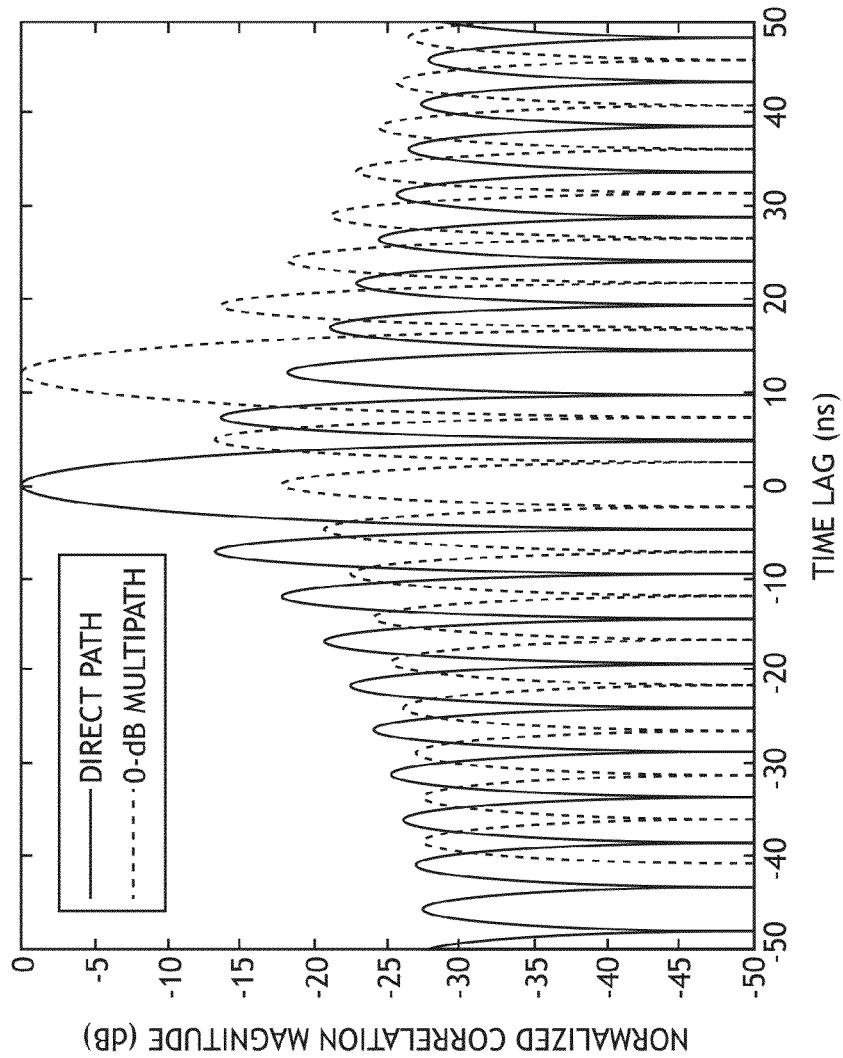
FIG. 3 is an illustration depicting the correlation functions of a direct path signal and a multipath signal obtained using a rectangular window.
Figure 4:
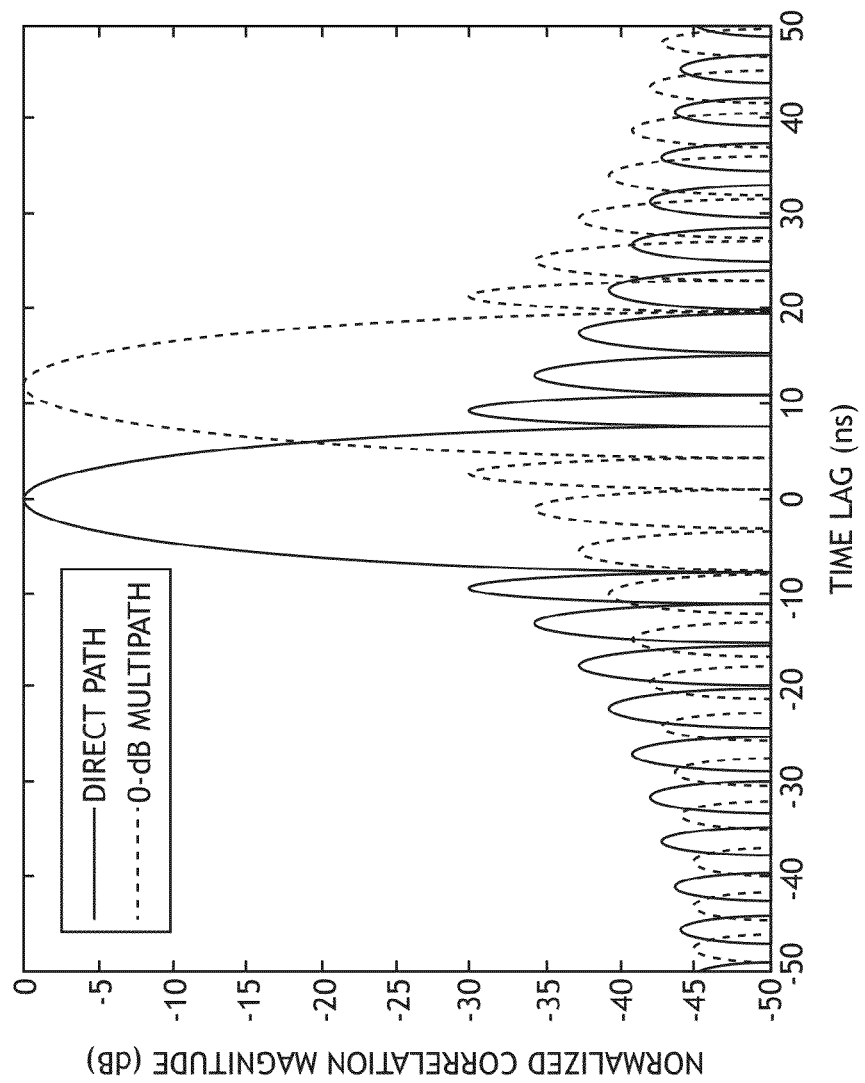
FIG. 4 is an illustration depicting the correlation functions of a direct path signal and a multipath signal obtained using a Kaiser window.

It is noted that applying the frequency-domain windowing process (i.e., step 112) prior to the integration process (i.e., step 116) may help in mitigating (or eliminating) multipath correlation side-peaks. The effects on the time-domain correlation function (after integration) are shown in FIGS. 3 and 4 for illustrative purposes. More specifically, FIG. 3 shows the correlation functions of a direct path signal (shown in solid lines) and a multipath signal of equal power (shown in dashed lines) with excess path delay equal to 12 nanoseconds obtained using a rectangular window (corresponding to the window function 202 shown in FIG. 2). FIG. 4 shows the same correlation functions, but with a Kaiser window (corresponding to the window function 204 shown in FIG. 2) instead. It is noted that correlation side-peaks with the use of the Kaiser window are reduced relative to the rectangular window. This reduction in side-peak power means that the multipath signal has a reduced distortion effect on the correlation output, enabling precision PNT estimation even in the presence of multipath.

Figure 5:
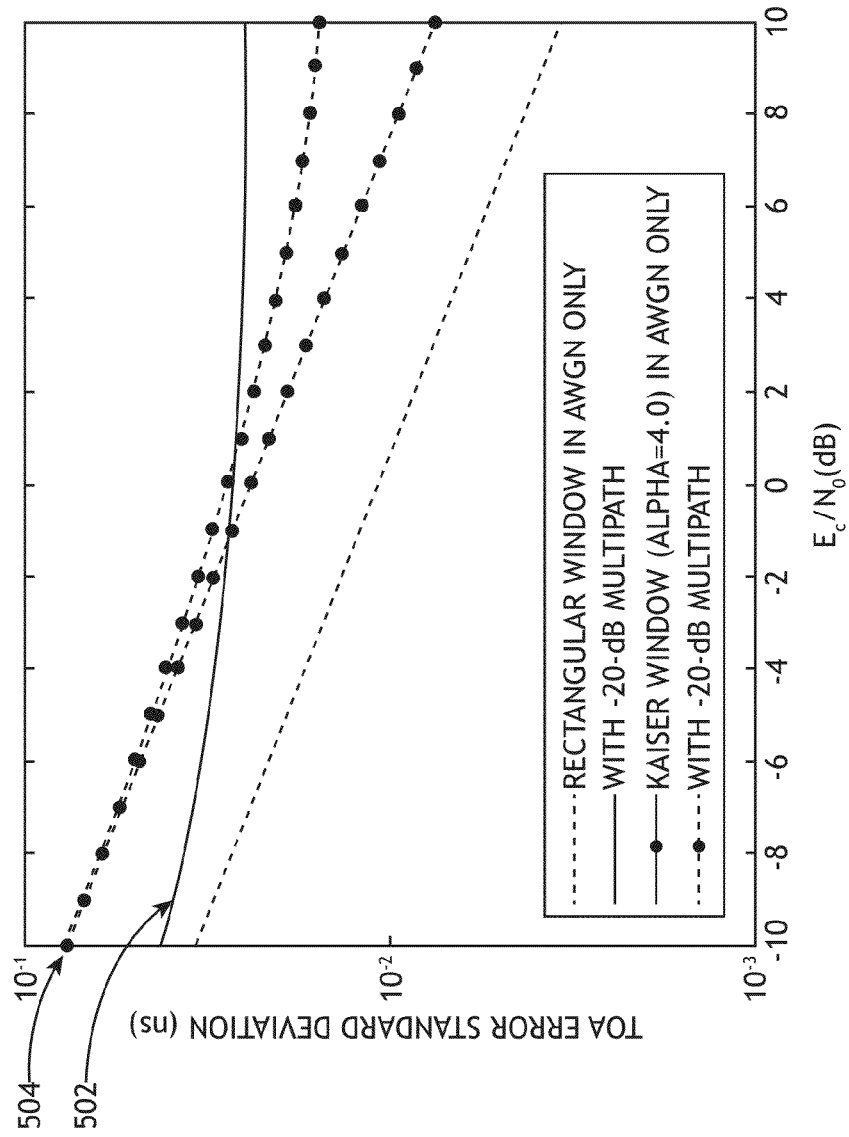
FIG. 5 is an illustration depicting the impact of a rectangular window and a Kaiser window in terms of time-of-arrival estimation.

FIG. 5 is an illustration depicting the impact of the rectangular window and the Kaiser window in terms of time-of-arrival (TOA) estimation. Continuing with the example described above, consider a system that coherently hops over 26 carrier frequencies contiguously spread over 200 MHz. FIG. 5 shows the Cramer-Rao TOA lower bounds 502 for the performance of such a system with the rectangular window 202 and the Cramer-Rao TOA lower bounds 504 for the performance of the same system with the Kaiser window 204 (alpha=4.0). For illustrative purposes, performance is shown in additive white Gaussian noise (AWGN) only and with multipath (single reflected path 20 dB below direct path, 12-nanosecond excess path delay). It is noted that $E_c/N_0$ denotes the signal-to-noise ratio (SNR) per chip of the signal as it occupies a single carrier frequency.

As shown in FIG. 5, the rectangular window 202 performs better (lower TOA error standard deviation) than the Kaiser window 204 in AWGN only. This is because the Kaiser window may result in a lower root-mean-square (RMS) bandwidth which may increase the Cramer-Rao lower bound in AWGN. In multipath, the Kaiser window performs better than the rectangular window at higher SNR per chip (greater than about 0 dB in this example). This is the region where the multipath contribution to the TOA error overwhelms the AWGN contribution. It is noted that at lower SNR per chip, where AWGN dominates, the rectangular window 202 may outperform the Kaiser window 204.

It is to be understood that the references to 26 carrier frequencies contiguously spread over 200 MHz (as described in the examples above) are merely depicted for illustrative purposes. The number of carrier frequencies and the frequency ranges may vary without departing from the broad scope of the inventive concepts disclosed herein. It is also to be understood that embodiments of the method 100 disclosed herein are not limited to any particular signal type. It is contemplated that signals of various types, including electromagnetic signals such as radio signals, microwave signals, optical signals, acoustic signals and the like may be processed utilizing embodiments of the method 100 without departing from the broad scope of the inventive concepts disclosed herein. It is contemplated that utilizing embodiments of the method 100 may help mitigate multipath effects on these various signal types. And it is noted that the term multipath may refer to multiple propagation delays regardless of whether they are due to traveling in different spatial paths or due to propagation at different rates such as optical propagation through a birefringent medium.

It is also to be understood that the references to the rectangular window and the Kaiser window in the illustrations depicted above are merely exemplary. As mentioned previously, various other types of window functions may be utilized without departing from the broad scope of the inventive concepts disclosed herein. It is noted that the choice of window functions may also change based on specific operating conditions and specific objectives. For instance, as shown in FIG. 5, the choice may be a compromise between correlation side-peak suppression and broadening of the main peak, wherein lowering correlation side-peaks may enable better mitigation of distortion caused by multipath, but may lead to a wider main correlation peak may, which may degrade performance in additive white Gaussian noise (AWGN). It is therefore contemplated that different window functions may be utilized for handling different situations without departing from the broad scope of the inventive concepts disclosed herein.

It is also contemplated that the choice of window functions may be controlled and/or changed dynamically and/or systematically. In certain embodiments, as shown in FIG. 1, an adaptive control loop may be utilized, allowing the channel performance to be characterized in a step 120, which may facilitate a window function selection process performed in a step 122. Implementing such an adaptive control loop may allow the window function to be selected based on real-time characterization of the channel. It is contemplated that any of a number of known or yet to be developed channel characterization techniques may be used, including estimation of channel impulse response, multipath delay spread, direct-path-to-multipath power ratio, signal-to-noise ratio and the like. The window selection process may then choose an appropriate window function that optimizes performance based on the channel characterization(s). Depending on the channel characterization(s) used, the window selection process may be implemented as simply as a look-up table, or it may be implemented as any of a number of optimization algorithms without departing from the broad scope of the inventive concepts disclosed herein.

While the specific window functions used to carry out the frequency-domain windowing processes may vary, it is noted, however, that the overall process for mitigating multipath effects in accordance with the inventive concepts disclosed herein is configured to operate solely on the signals received, and therefore the transmitted signals are not affected by this process. Containing the scope of data processing to be within the signals received in this manner may be appreciated because it does not alter the transmitted spectrum, and therefore has no undesirable consequences on other aspects of system performance, effectively overcoming problems associated with existing techniques used for reducing correlation side-peaks.

Figure 6:
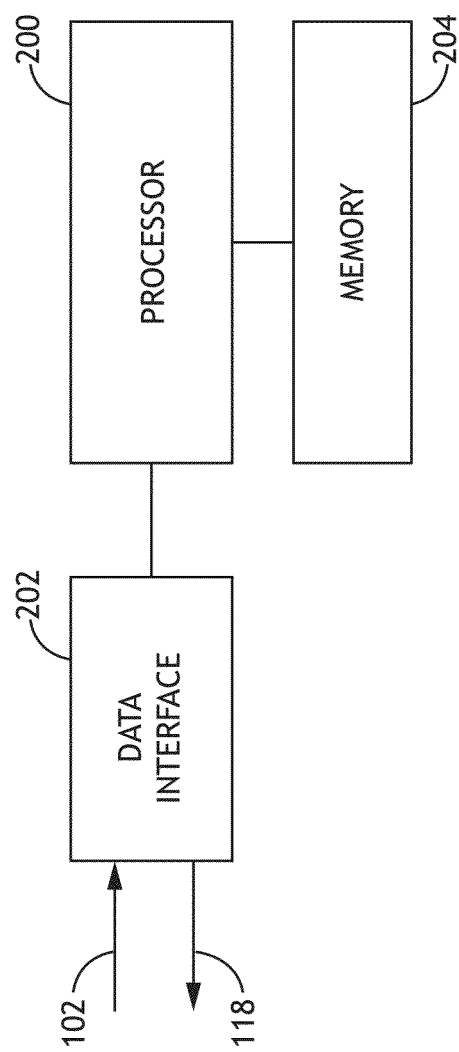
FIG. 6 is a block diagram depicting a precision PNT estimation processor configured to mitigate multipath effects on precision PNT estimation in accordance with the inventive concepts disclosed herein.

It is contemplated that the method 100 for mitigating multipath effects on precision PNT estimation in accordance with the inventive concepts disclosed herein may be implemented utilizing one or more processors 200 as shown in FIG. 6. More specifically, a data interface 202 may be utilized to receive the input signal 102, provide the received input signal 102 to the one or more processors 200 for processing, and provide the integrated correlation output 118 as the output. It is contemplated that the one or more processors 200 may be implemented as a dedicated processing unit, an application-specific integrated circuit (ASIC), an integrated component of an existing hardware or firmware configured to control operations of a system (e.g., a positioning system that needs to perform PNT estimation), or various other types of processors or processing units. The one or more processors 200 may be in communication with a non-transitory processor-readable memory 204 configured for storing processor-executable code and data. When the processor-executable code is executed by the one or more processors 200, the one or more processors 200 may carry out the method 100 for mitigating multipath effects on precision PNT estimation in accordance with the inventive concepts disclosed herein.

Figure 7:
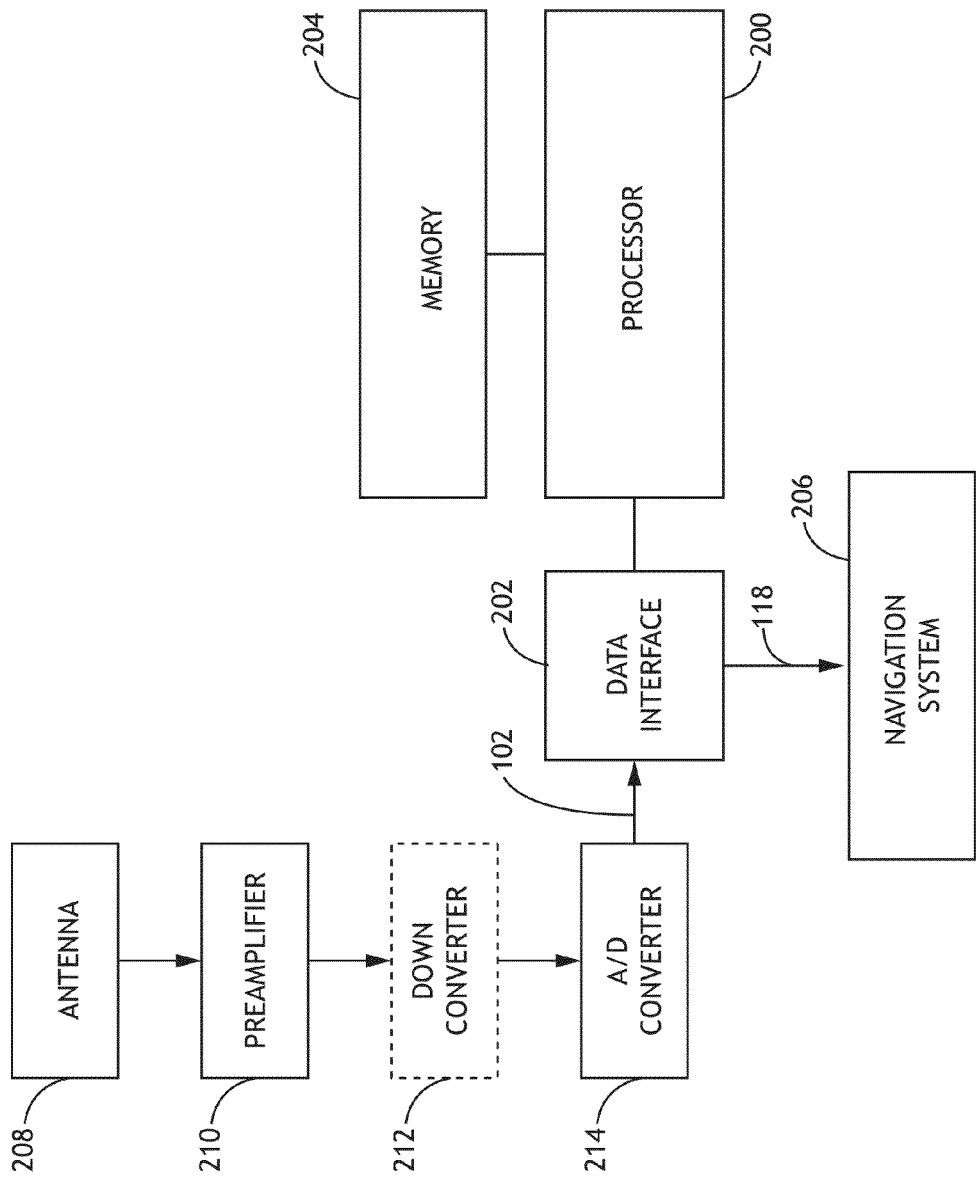
FIG. 7 is a block diagram depicting a system that utilizes the PNT estimation processor to mitigate multipath effects.

Referring now to FIG. 7, an exemplary system 206 (e.g., a navigation system) utilizing a PNT estimation processor 200 to mitigate multipath effects is shown. More specifically, an antenna 208 may be utilized by the navigation system 206 to receive a navigation signal. The navigation signal may be processed through a preamplifier 210 and an optional down converter 212, and an analog-to-digital converter 214 may be utilized to convert the navigation signal into a digital signal. The analog-to-digital converter 214 may then provide the navigation signal as an input signal 102 to the PNT estimation processor 200 through the data interface 202. The PNT estimation processor 200 may process the input signal 102 to mitigate multipath effects as previously described and provide an integrated correlation output 118 as the output through the data interface 202. The integrated correlation output 118 may then be provided to the navigation system 206, which may carry out its intended data processing functions accordingly.

It is to be understood that the exemplary system 206 is shown for illustrative purposes, and it is contemplated that the front end components (e.g., the antenna 208, the preamplifier 210, the A/D converter and the like) utilized for signal processing may vary without departing from the broad scope of the inventive concepts disclosed herein. For instance, different types of receivers may be utilized for receiving and processing optical signals, acoustic signals, and other types of signals. It is also contemplated that the exemplary systems depicted above may be installed on various types of stationary and/or mobile devices, including manned or unmanned aerial vehicles, land vehicles, maritime vehicles, as well as space vehicles.

It is to be understood that the present disclosure may be conveniently implemented in forms of a software, hardware or firmware package. It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
channelizing an input signal into a plurality of carrier-specific signals, wherein each carrier-specific signal of the plurality of carrier-specific signals corresponds to a signal transmitted on a particular carrier of a plurality of carriers utilized to transmit the input signal;
correlating each carrier-specific signal against a reference signal to produce a corresponding carrier-specific correlation result for each particular carrier of the plurality of carriers;
applying a window function to the carrier-specific correlation results for the plurality of carriers to produce a set of carrier-specific weighted correlation results;
integrating the set of carrier-specific weighted correlation results to produce an integrated correlation output; and
providing the integrated correlation output to facilitate a data process.

2. The method of claim 1, wherein the integrated correlation output is provided to facilitate a position, navigation, and timing (PNT) estimation.

3. The method of claim 1, wherein said integrating the set of carrier-specific weighted correlation results includes calculating a sum of the set of carrier-specific weighted correlation results.

4. The method of claim 1, wherein the input signal is a multicarrier signal, and wherein each carrier-specific signal of the plurality of carrier-specific signals corresponds to a signal transmitted on a particular carrier frequency of a plurality of carrier frequencies utilized to transmit the input signal.

5. The method of claim 1, wherein the input signal is a frequency-hopping signal, and wherein each carrier-specific signal of the plurality of carrier-specific signals corresponds to a signal transmitted on a particular carrier frequency of a plurality of carrier frequencies utilized to transmit the input signal.

6. The method of claim 1, further comprising:
selecting the window function based on at least one channel characteristic.

7. The method of claim 6, further comprising:
determining said at least one channel characteristic based on the integrated correlation output; and
adjusting a window function selection based on said at least one channel characteristic.

8. A method, comprising:
channelizing an input signal into a plurality of carrier-specific signals, wherein each carrier-specific signal of the plurality of carrier-specific signals corresponds to a signal transmitted on a particular carrier of a plurality of carriers utilized to transmit the input signal;
correlating each carrier-specific signal against a reference signal to produce a corresponding carrier-specific correlation result for each particular carrier of the plurality of carriers;
applying a window function to the carrier-specific correlation results for the plurality of carriers to produce a set of carrier-specific weighted correlation results;
integrating the set of carrier-specific weighted correlation results to produce an integrated correlation output; and
providing the integrated correlation output to facilitate a position, navigation, and timing (PNT) estimation.

9. The method of claim 8, wherein said integrating the set of carrier-specific weighted correlation results includes calculating a sum of the set of carrier-specific weighted correlation results.

10. The method of claim 8, wherein the input signal is a multicarrier signal, and wherein each carrier-specific signal of the plurality of carrier-specific signals corresponds to a signal transmitted on a particular carrier frequency of a plurality of carrier frequencies utilized to transmit the input signal.

11. The method of claim 8, wherein the input signal is a frequency-hopping signal, and wherein each carrier-specific signal of the plurality of carrier-specific signals corresponds to a signal transmitted on a particular carrier frequency of a plurality of carrier frequencies utilized to transmit the input signal.

12. The method of claim 8, further comprising:
selecting the window function based on at least one channel characteristic.

13. The method of claim 12, further comprising:
determining said at least one channel characteristic based on the integrated correlation output; and
adjusting a window function selection based on said at least one channel characteristic.

14. A system, comprising:
a data interface configured to receive an input signal; and
a processor in communication with the data interface, the processor configured to:
channelize the input signal into a plurality of carrier-specific signals, wherein each carrier-specific signal of the plurality of carrier-specific signals corresponds to a signal transmitted on a particular carrier of a plurality of carriers utilized to transmit the input signal;
correlate each carrier-specific signal against a reference signal to produce a corresponding carrier-specific correlation result for each particular carrier of the plurality of carriers;
apply a window function to the carrier-specific correlation results for the plurality of carriers to produce a set of carrier-specific weighted correlation results;
integrate the set of carrier-specific weighted correlation results to produce an integrated correlation output; and
provide the integrated correlation output to facilitate a data process.

15. The system of claim 14, wherein the integrated correlation output is provided through the data interface to a position, navigation, and timing (PNT) estimation process.

16. The system of claim 14, wherein the processor integrates the set of carrier-specific weighted correlation results by calculating a sum of the set of carrier-specific weighted correlation results.

17. The system of claim 14, wherein the input signal is a multicarrier signal, and wherein each carrier-specific signal of the plurality of carrier-specific signals corresponds to a signal transmitted on a particular carrier frequency of a plurality of carrier frequencies utilized to transmit the input signal.

18. The system of claim 14, wherein the input signal is a frequency-hopping signal, and wherein each carrier-specific signal of the plurality of carrier-specific signals corresponds to a signal transmitted on a particular carrier frequency of a plurality of carrier frequencies utilized to transmit the input signal.

19. The system of claim 14, wherein the processor is further configured to select the window function based on at least one channel characteristic.

20. The system of claim 19, wherein the processor is further configured to:
- determine said at least one channel characteristic based on the integrated correlation output; and
- adjust a window function selection based on said at least one channel characteristic.

\* \* \* \* \*